United States Patent
Liu et al.

(10) Patent No.: US 10,691,916 B1
(45) Date of Patent: Jun. 23, 2020

(54) PATTERN RECOGNITION DEVICE, ARRAY SUBSTRATE AND DISPLAY APPARATUS

(71) Applicant: BOE Technology Group Co., Ltd., Beijing (CN)

(72) Inventors: Yingming Liu, Beijing (CN); Haisheng Wang, Beijing (CN); Xue Dong, Beijing (CN); Xiaoliang Ding, Beijing (CN); Rui Xu, Beijing (CN); Changfeng Li, Beijing (CN); Pinchao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/326,478

(22) PCT Filed: May 11, 2018

(86) PCT No.: PCT/CN2018/086517
§ 371 (c)(1),
(2) Date: Feb. 19, 2019

(87) PCT Pub. No.: WO2019/029206
PCT Pub. Date: Feb. 14, 2019

(30) Foreign Application Priority Data

Aug. 9, 2017 (CN) .......................... 2017 1 0677028

(51) Int. Cl.
*G06K 9/00* (2006.01)

(52) U.S. Cl.
CPC .................. *G06K 9/0004* (2013.01)

(58) Field of Classification Search
CPC ............ G06K 9/00013; G06K 9/0004; G06K 9/00006; G06K 9/209; G06K 9/00046; G06K 9/0012; G06K 9/00
See application file for complete search history.

(56) References Cited

U.S. PATENT DOCUMENTS

| | | | |
|---|---|---|---|
| 2010/0008544 | A1 | 1/2010 | Abe et al. |
| 2013/0009046 | A1 | 1/2013 | Yu et al. |

(Continued)

FOREIGN PATENT DOCUMENTS

| | | |
|---|---|---|
| CN | 101285975 A | 10/2008 |
| CN | 102866787 A | 1/2013 |

(Continued)

OTHER PUBLICATIONS

International Search and Written Opinion, including English translations of search report and Box V of written opinion, for International Application No. PCT/CN2018/086517, dated Aug. 16, 2018, 9 pages.

*Primary Examiner* — Koosha Sharifi-Tafreshi
(74) *Attorney, Agent, or Firm* — Westman, Champlin & Koehler, P.A.

(57) ABSTRACT

Disclosed are a pattern recognition device, an array substrate and a display apparatus. The pattern recognition device includes: a base substrate; and a plurality of pattern recognizers on the base substrate, at least one of the plurality of pattern recognizers including a photosensitive structure and an optical path selector. The photosensitive structure includes a first light-shielding electrode, a photoelectric conversion and a second light-shielding electrode which are arranged in a stacked manner, the first light-shielding electrode including a light-transmitting region; and the optical path selector is configured to direct pattern light rays having a predetermined angle with respect to a surface of the pattern recognition device to the light-transmitting region.

20 Claims, 7 Drawing Sheets

(56) References Cited

U.S. PATENT DOCUMENTS

2018/0053032 A1* 2/2018 Ding .................... G06K 9/0004
2019/0065809 A1 2/2019 Li et al.

FOREIGN PATENT DOCUMENTS

| CN | 106096595 A | 11/2016 |
| CN | 206179868 U | 5/2017 |
| CN | 107423723 A | 12/2017 |

* cited by examiner

PATTERN RECOGNITION DEVICE, ARRAY SUBSTRATE AND DISPLAY APPARATUS

CROSS-REFERENCE TO RELATED APPLICATION

This application is a Section 371 National Stage Application of International Application No. PCT/CN2018/086517, filed on May 11, 2018, entitled "PATTERN RECOGNITION DEVICE, ARRAY SUBSTRATE AND DISPLAY APPARATUS", which published as WO 2019/029206 A1 on 14 Feb. 2019, which claims priority to Chinese Patent Application No. 201710677028.2 filed on Aug. 9, 2017 in the State Intellectual Property Office of China, the whole disclosure of which is incorporated herein by reference.

TECHNICAL FIELD

Embodiments of the present disclosure relate to the field of display technology or detection technology, and in particular, to a pattern recognition device, an array substrate, and a display apparatus.

BACKGROUND

Fingerprints are invariant features that are inherent in the human body, unique and distinguishable from others. A fingerprint consists of a series of ridges and valleys on epidermis of a tip of a finger. Details of these ridges and valleys generally include bifurcations of the ridges, ends of the ridges, arches, tent-shaped arches, sinistral details, dextral details, spiral or twisted details, etc., which determine the uniqueness of a fingerprint pattern. A fingerprint recognition technology developed based on the fingerprints is earlier used as a technology for personal authentication. According to different manners of fingerprint acquisition and input, the fingerprint recognition technologies which are widely used and well-known may include a technology based on optical imaging, a technology based on thermosensitive sensors, a technology based on human body far-infrared sensors, and the like. Among them, the optical imaging is generally performed by using a photodiode.

With rapid development of display technology, display panels with fingerprint recognition function have gradually spread to people's lives. At present, a structure in which a fingerprint recognition device is integrated into a display panel has appeared. However, in the display panel into which the fingerprint recognition device is integrated, light rays reflected by a valley of the fingerprint and light rays reflected by a ridge of the fingerprint may be incident to the same one photoelectric conversion layer, resulting in a light mixing problem. As a result, it is difficult to obtain a pattern of the fingerprint at high definition.

SUMMARY

In an aspect, it is provided a pattern recognition device including: a base substrate; and a plurality of pattern recognizers on the base substrate, at least one of the plurality of pattern recognizers including a photosensitive structure and an optical path selector. The photosensitive structure includes a first light-shielding electrode, a photoelectric conversion layer and a second light-shielding electrode which are arranged in a stacked manner, the first light-shielding electrode including a light-transmitting region; and the optical path selector is configured to direct pattern light rays having a predetermined angle with respect to a surface of the pattern recognition device to the light-transmitting region.

Optionally, the optical path selector includes: a first inclined reflective face; and a second inclined reflective face opposite to the first inclined reflective face.

Optionally, a distance between the first inclined reflective face and the second inclined reflective face is gradually increased in a direction from the base substrate to the photosensitive structure; and the first light-shielding electrode, the photoelectric conversion layer and the second light-shielding electrode are sequentially stacked in the direction from the base substrate to the photosensitive structure.

Optionally, the optical path selector further includes: a first light absorbing face which connects the first inclined reflective face with the second inclined reflective face at a side of the optical path selector close to the base substrate.

Optionally, the optical path selector further includes: a second light absorbing surface on a side of the first light-shielding electrode facing towards the base substrate.

Optionally, the at least one of the plurality of pattern recognizers further includes: a switching transistor connected to the photosensitive structure, the switching transistor being disposed between the base substrate and the optical path selector.

Optionally, the first inclined reflective face and the second inclined reflective face are parallel to each other; and the second light-shielding electrode, the photoelectric conversion layer and the first light-shielding electrode are sequentially stacked in a direction from the base substrate to the photosensitive structure.

Optionally, the optical path selector further includes: a third light absorbing face on a side of the first light-shielding electrode facing away from the base substrate.

Optionally, the optical path selector further includes: a fourth light absorbing face at an end of the first inclined reflective face or the second inclined reflective face away from the base substrate.

Optionally, the at least one of the plurality of pattern recognizers further includes: a switching transistor connected to the photosensitive structure, the switching transistor being disposed between the base substrate and the photosensitive structure.

Optionally, an included angle between the first inclined reflective face and the base substrate is equal to an included angle between the second inclined reflective face and the base substrate; and the optical path selector is configured to reflect the pattern light rays having the predetermined angle with respect to the surface of the pattern recognition device to the light-transmitting region, the predetermined angle being substantially double of the included angle between the first inclined reflective face and the base substrate or the included angle between the second inclined reflective face and the base substrate.

Optionally, each of the included angle between the first inclined reflective face and the base substrate and the included angle between the second inclined reflective face and the base substrate is equal to 45 degrees; and an orthographic projection of the light-transmitting region of the first light-shielding electrode on the base substrate and an orthographic projection of the second inclined reflective face on the base substrate at least partially coincide with each other.

Optionally, each of the included angle between the first inclined reflective face and the base substrate and the included angle between the second inclined reflective face and the base substrate is larger than 45 degrees; and an orthographic projection of the light-transmitting region of the first light-shielding electrode on the base substrate is offset towards the first inclined reflective face with respect to an orthographic projection of the second inclined reflective face on the base substrate. Optionally, each of the included angle between the first inclined reflective face and the base substrate and the included angle between the second inclined reflective face and the base substrate is less than 45 degrees, and an orthographic projection of the light-transmitting region of the first light-shielding electrode on the base substrate is offset away from the first inclined reflective face with respect to an orthographic projection of the second inclined reflective face on the base substrate.

Optionally, the first light-shielding electrode is electrically connected to a drain electrode of the switching transistor, and the second light-shielding electrode is electrically connected to an electrode line which applies a constant electrical potential; or the first light-shielding electrode is electrically connected to an electrode line which applies a constant electrical potential, and the second light-shielding electrode is electrically connected to a drain electrode of the switching transistor.

Optionally, the electrode line which applies the constant electrical potential is disposed in the same layer as the drain electrode of the switching transistor.

Optionally, the optical path selector is disposed between the base substrate and the photosensitive structure, or the optical path selector is disposed on a side of the photosensitive structure facing away from the base substrate.

In another aspect, embodiments of the present disclosure provide an array substrate including: a plurality of display units in a display area; and the pattern recognition device as stated above in the display area.

Optionally, the display unit includes a light emitting structure and a driving circuit including a driving transistor; an anode of the light emitting structure being electrically connected to the driving circuit, and the anode being a reflective electrode; and the switching transistor of the pattern recognition device is disposed in the same layer as the driving transistor, and the first light-shielding electrode or the second light-shielding electrode of the pattern recognition device is disposed in the same layer as the anode.

In a further aspect, embodiments of the present disclosure provide a display apparatus including the array substrate as stated above.

DETAILED DESCRIPTION OF EMBODIMENTS

Specific implementations of a pattern recognition device, an array substrate, and a display apparatus provided by embodiments of the present disclosure will be described in detail below with reference to the accompanying drawings.

The shape and size of each film layer in the drawings do not reflect the true scale of the pattern recognition device, and are merely intended to illustrate contents of the embodiments of the present disclosure.

Herein, an expression "pattern light ray" may refer to a light ray reflected by a pattern such as fingerprint. For example, when a light ray is incident onto a pattern such as fingerprint and is reflected by the pattern such as fingerprint, the light ray reflected by the pattern such as fingerprint may be expressed as "pattern light ray".

Figure 1:
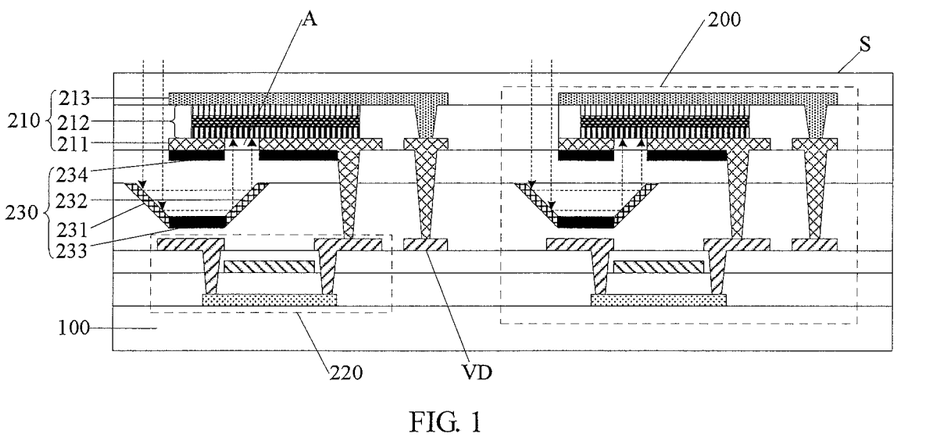
FIG. 1 is a schematic structural diagram of a pattern recognition device according to an embodiment of the present disclosure.
Figure 2:
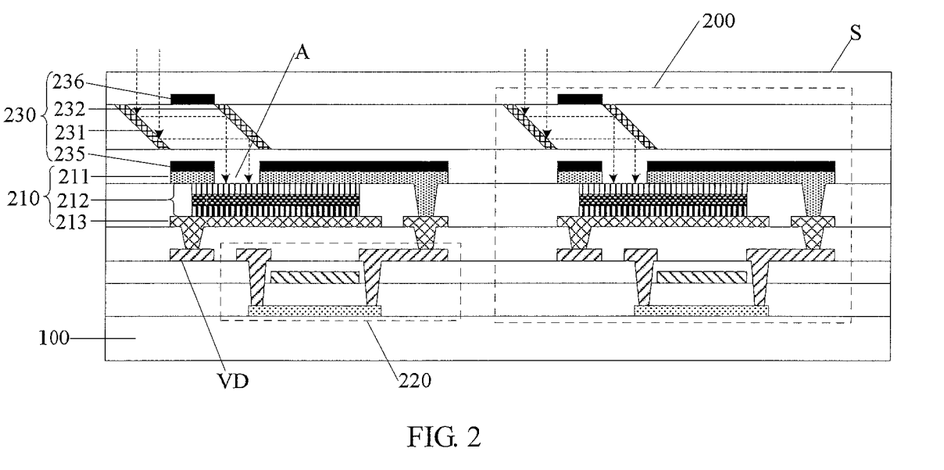
FIG. 2 is a schematic structural diagram of a pattern recognition device according to another embodiment of the present disclosure.

A pattern recognition device, as shown in FIG. 1 and FIG. 2, includes: a base substrate 100 and a plurality of pattern recognizers 200 on the base substrate 100. Each of the pattern recognizers 200 includes: a photosensitive structure 210, and an optical path selector 230 corresponding to the photosensitive structure 210.

The photosensitive structure 210 includes a first light-shielding electrode 211, a photoelectric conversion layer 212, and a second light-shielding electrode 213 which are arranged in a stacked manner. The first light-shielding electrode 211 has a light-transmitting region. In the context, the expression "light-transmitting region" may refer to a region through which light rays may transmit, and it is to be understood by those skilled in the art that the light-transmitting region may include a transparent portion made of a transparent material or an opening area. For example, the first light-shielding electrode 211 may have a transparent portion or has an opening area A. Hereinafter, the opening area is taken as an example for explanation.

The optical path selector 230 is configured to direct pattern light rays having a predetermined angle with respect to a surface (for example, an upper surface S of the pattern recognition device shown in FIG. 1) of the pattern recognition device to the opening area A.

For example, the optical path selector 230 may include: a first inclined reflective face 231, a second inclined reflective face 232 opposite to the first inclined reflective face 231.

Specifically, in the above-described pattern recognition device provided by the embodiment of the present disclosure, two inclined reflective faces are used to constitute the optical path selector 230, so that the pattern light rays which have a predetermined angle with respect to a surface of the pattern recognition device are reflected to the photoelectric conversion layer 212 of the photosensitive structure 210. Both the first light-shielding electrode 211 and the second light-shielding electrode 213, which are stacked on the photoelectric conversion layer 212 in the photosensitive structure 210, are opaque, and only the first light-shielding electrode 211 is provided with the opening area A, thus the pattern light rays may irradiate onto the photoelectric conversion layer 212 only from the opening area A. As a result, only the pattern light rays which have the predetermined angle with respect to the surface of the pattern recognition device may be incident to the opening area A by means of reflection of the optical path selector 230. In this way, in a case where a distance between the pattern (for example, fingerprint of a finger) and the photosensitive structure 210 is large (for example, the distance may be 1 mm), light ray reflected by valleys of the pattern and light ray reflected by ridges of the pattern do not mix with each other in the photosensitive structure 210, thus the pattern may be identified at high definition, which will be described in detail below. Since the optical path selector 230 is configured by using two inclined reflective faces which are relatively simple in structure to filter the pattern light rays at other angles, it is not necessary to provide a complicated light collimating device or an optical fiber in the pattern recognition device, which is easy to mass-produce.

Optionally, in the above-mentioned pattern recognition device provided by the embodiment of the present disclosure, in order to ensure that both the first light-shielding electrode 211 and the second light-shielding electrode 213 in the photosensitive structure 210 are opaque, in specific implementation, molybdenum (i.e., Mo) or other conductive black materials may be used to form the light-shielding electrodes. Further optionally, an area of each of the first light-shielding electrode 211 and the second light-shielding electrode 213 may be slightly larger than an area of the photoelectric conversion layer 212, that is, both an orthographic projection of a combination of the first light-shielding electrode 211 and the opening area A on the base substrate 100 and an orthographic projection of the second light-shielding electrode 213 on the base substrate 100 may cover an orthographic projection of the photoelectric conversion layer 212 on the base substrate 100, to improve light-shielding property.

For example, the photosensitive structure 210 may have a structure of a PIN junction photodiode. The photoelectric conversion layer 212 may include a P-type semiconductive layer, an intrinsic semiconductive layer and an N-type semiconductive layer so as to realize a photoelectric conversion function.

In order to ensure that the light rays reflected by the optical path selector 230 may be incident to the opening area A in the first light-shielding electrode 211, it is desired to set the opening area A according to an exit angle of light rays reflected by the second inclined reflective face 232 of the optical path selector 230. It is to be noted that the exit angle of the light rays reflected by the second inclined reflective face 232 of the optical path selector 230 is related with an incident angle of the light rays which are incident onto the first inclined reflective face 231 of the optical path selector 230 from the surface of the pattern recognition device. The exit angle may be equal to the incident angle, or the exit angle may be different from the incident angle. Specifically, the relationship between the exit angle and the incident angle may depend on a relative positional relationship between the first inclined reflective face 231 and the second inclined reflective face 232, and slope angles of both the first inclined reflective face 231 and the second inclined reflective face 232, which will be described in detail below.

In specific implementation, in the above-mentioned pattern recognition device provided by the embodiment of the present disclosure, the optical path selector 230 may be disposed above the photosensitive structure 210 to reflect light rays having the predetermined angle above the pattern recognition device to the photosensitive structure below the optical path selector 230. Alternatively, the optical path selector 230 may be disposed below the photosensitive structure 210 to reflect light rays having the predetermined angle above the pattern recognition device to the photosensitive structure 210 above the optical path selector 230. Further, an internal structure of the optical path selector 230 may be variant depending on positions of film layers of the optical path selector 230.

Specifically, in the above-described pattern recognition device provided by the embodiment of the present disclosure, as shown in FIG. 1, the optical path selector 230 may be disposed between the base substrate 100 and the photosensitive structure 210, that is, the photosensitive structure 210 is disposed on a side of the photosensitive structure 210 facing away from the base substrate 100. In this case, the optical path selector 230 needs to reflect the pattern light rays having the predetermined angle above the pattern recognition device to the opening area A of the photosensitive structure 210 above the optical path selector 230, thus the optical path selector 230 may be specifically embodied in structure as follows. The first inclined reflective face 231 and the second inclined reflective face 232 may be symmetrically arranged with respect to a symmetrical axis perpendicular to the base substrate 100. In other words, the first inclined reflective face 231 may have the same slope angle as the second inclined reflective face 232, a slope of the first inclined reflective face 231 is opposite to a slope of first inclined reflective face 231, and a distance between the inclined reflective face 231 and the second inclined reflective face 232 is gradually increased in a direction from the base substrate 100 to the photosensitive structure 210. Correspondingly, in the photosensitive structure 210, the first light-shielding electrode 211, the photoelectric conversion layer 212 and the second light-shielding electrode 213 are sequentially stacked on the base substrate 100, that is, the opening area A is provided below the photosensitive structure 210. Herein, an expression "slope angle" refers to an included angle between the inclined reflective face and the base substrate, for example, an included angle, which is less than or equal to 90 degrees, between the first inclined reflective face 231 or the second inclined reflective face 232 and the base substrate 100.

It should be noted that the specific structure of the optical path selector 230 is only an example. In actual application, when the optical path selector 230 is disposed between the base substrate 100 and the photosensitive structure 210, the first inclined reflective face 231 may have a different slope angle from the second inclined reflective face 232, and the distance between the first inclined reflective face 231 and the second inclined reflective face 232 is gradually increased in the direction from the base substrate 100 to the photosensitive structure 210. The embodiments of the present disclosure are not limited to the specific structure here.

Further, in the above-described pattern recognition device provided by the embodiment of the present disclosure, when the optical path selector 230 is disposed between the base substrate 100 and the photosensitive structure 210, in order to prevent pattern light rays except for the light rays which have the predetermined angle with respect to the surface of the pattern recognition device from entering the opening area A, undesired interference light rays may be absorbed. Specifically, as shown in FIG. 1, the optical path selector 230 may further include a first light absorbing face such as a first light absorbing surface 233, which connects the first inclined reflective face 231 with the second inclined reflective face 232 at a side close to the base substrate 100. The first light absorbing surface 233 may absorb the pattern light rays which have undesired angles and are reflected by the first inclined reflective face 231.

Similarly, in the above-described pattern recognition device provided by the embodiment of the present disclosure, when the optical path selector 230 is disposed between the base substrate 100 and the photosensitive structure 210, in order to prevent pattern light rays except for the light rays which have the predetermined angle with respect to the surface of the pattern recognition device from entering the opening area A, undesired interference light rays may be absorbed. Specifically, as shown in FIG. 1, the optical path selector 230 may further include a second light absorbing face such as a second light absorbing surface 234, which is disposed on a lower surface (that is, a surface of the first light-shielding electrode 211 facing towards the base substrate 100) of the first light-shielding electrode 211. The second light absorbing surface 234 may absorb the pattern light rays which have undesired angles and are reflected by the second inclined reflective face 232. Moreover, in specific implementation, the second light absorbing surface 234 may be disposed on the entire lower surface of the first light-shielding electrode 211, or may be disposed on a part of the lower surface of the first light-shielding electrode 211 which is just opposite to the first light absorbing surface 233. The embodiments of the present disclosure are not limited to the specific implementation.

Figure 3A:
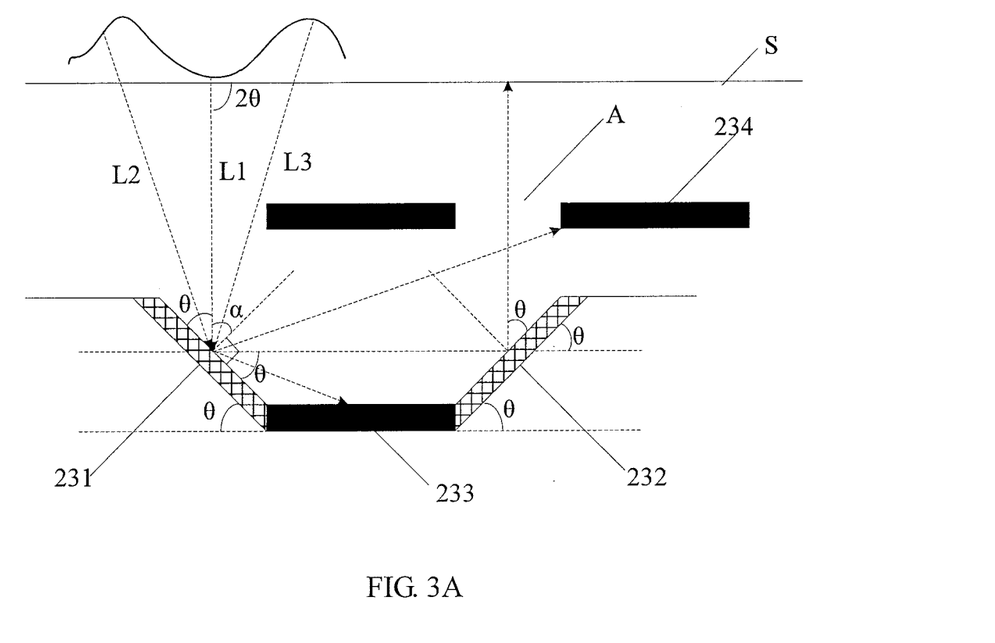
FIG. 3A to FIG. 3C are schematic diagrams showing specific principles of an optical path selector in the pattern recognition device shown in FIG. 1.
Figure 3B:
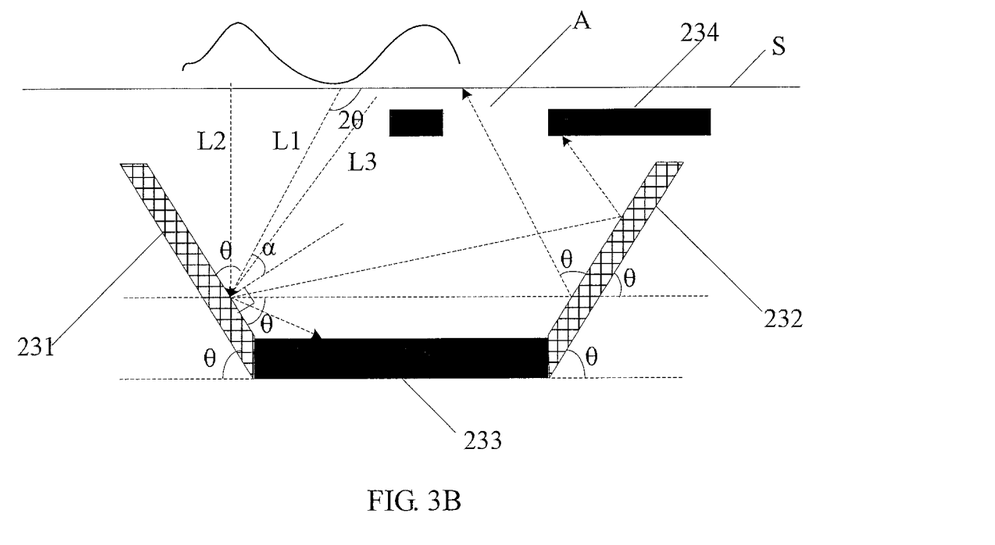
Figure 3C:
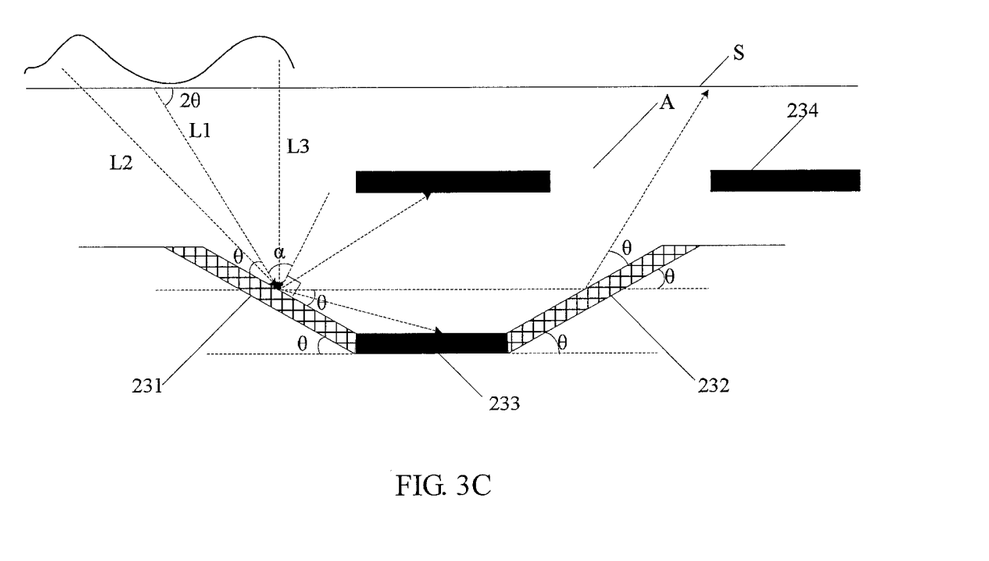

In specific implementation, in the above-described pattern recognition device provided by the embodiment of the present disclosure, when the optical path selector 230 is disposed between the base substrate 100 and the photosensitive structure 210, as shown in FIG. 3A to FIG. 3C, an included angle between the first inclined reflective face 231 and the base substrate 100 may be equal to an included angle between the second inclined reflective face 232 and the base substrate 100, the included angles may both have θ degrees, that is, both the slope angles may be θ degrees. In this case, the optical path selector 230 is configured to reflect the pattern light rays which have an angle of about 2*θ degrees with respect to the surface of the pattern recognition device to the opening area A. Here, the included angle between the first inclined reflective face 231 and the base substrate 100 or the included angle between the second inclined reflective face 232 and the base substrate 100 may refer to an included angle between two faces which is less than or equal to 90 degrees, that is, one of included angles between the first inclined reflective face 231 and the base substrate 100 which is less than or equal to 90 degrees or one of included angles between the second inclined reflective face 232 and the base substrate 100 which is less than or equal to 90 degrees.

Thus, in the above-described pattern recognition device provided by the embodiment of the present disclosure, specific positions of the opening area A of the first light-shielding electrode 211 may be set according to a value of the slope angle θ of the first inclined reflective face 231 and a value of the slope angle θ of the second inclined reflective face 232.

For example, in the above-described pattern recognition device provided by the embodiment of the present disclosure, as shown in FIG. 3A, both the included angle θ between the first inclined reflective face 231 and the base substrate 100 and the included angle θ between the second inclined reflective face 232 and the base substrate 100 are equal to 45 degrees, that is, both the slope angles are equal to 45 degrees, the optical path selector 230 is configured to reflect the pattern light rays perpendicular to the surface of the pattern recognition device to the opening area A. In this case, in order to ensure that vertical light rays reflected by the second inclined reflective face 232 are all incident to the opening area A of the first light-shielding electrode 211, it is required to make an orthographic projection of the opening area A of the first light-shielding electrode 211 on the base substrate 100 and an orthographic projection of the second inclined reflective face 232 on the base substrate 100 at least partially coincide with each other, that is, the opening area A is opposite to the second inclined reflective face 232 in a direction perpendicular to the base substrate 100. As shown in FIG. 3A, the pattern light rays reflected by a fingerprint may include a pattern light ray L1 reflected by a ridge of the fingerprint and pattern light rays L2, L3 reflected by valleys adjacent to the ridge. An included angle between the pattern light ray L1 and the surface S of the pattern recognition device is equal to about 2*θ, that is, the pattern light ray L1 is perpendicular to the surface S of the pattern recognition device. As shown in FIG. 3A, the pattern light ray L1 is incident onto the first inclined reflective face 231. An incident angle of the pattern light ray L1 on the first inclined reflective face 231 may be labeled as α, and the incident angle α may satisfy the equation "α+θ=90°". In the example, the incident angle α is equal to 45 degrees. As shown in FIG. 3A, the pattern light ray L1 is reflected by the first inclined reflective face 231 and then is reflected by the second inclined reflective face 232 to the opening area A in a vertical direction. The pattern light ray L2 is incident onto the first inclined reflective face 231, and an incident angle of the pattern light ray L2 on the first inclined reflective face 231 is larger than 45 degrees, as shown in FIG. 3A, the pattern light ray L2 is reflected by the first inclined reflective face 231 to the first light absorbing surface 233. As a result, the pattern light ray L2 is absorbed by the first light absorbing surface 233. The pattern light ray L3 is incident onto the first inclined reflective face 231, and an incident angle of the pattern light ray L3 on the first inclined reflective face 231 is less than 45 degrees. As shown in FIG. 3A, the pattern light ray L3 is reflected by the first inclined reflective face 231 to the second light absorbing surface 234. As a result, the pattern light ray L3 is absorbed by the second light absorbing surface 234.

For example, in the above-described pattern recognition device provided by the embodiment of the present disclosure, as shown in FIG. 3B, both the included angle θ between the first inclined reflective face 231 and the base substrate 100 and the included angle θ between the second inclined reflective face 232 and the base substrate 100 are larger than 45 degrees, that is, the slope angles are larger than 45 degrees, the optical path selector 230 is configured to reflect the pattern light rays which have an angle of 2*θ degrees with respect to the surface of the pattern recognition device to the opening area A. In this case, in order to ensure that light rays reflected by the second inclined reflective face 232 in a direction at an angle of θ with respect to the second inclined reflective face 232 are all incident to the opening area A of the first light-shielding electrode 211, it is required that the orthographic projection of the opening area A of the first light-shielding electrode 211 on the base substrate 100 is offset leftward with respect to the orthographic projection of the second inclined reflective face 232 on the base substrate 100, and a specific offset value may depend on the value of θ and a distance between the second inclined reflective face 232 and the first light-shielding electrode 211. As shown in FIG. 3B, the pattern light rays reflected by a fingerprint may include a pattern light ray L1 reflected by a ridge of the fingerprint and pattern light rays L2, L3 reflected by valleys adjacent to the ridge. An included angle between the pattern light ray L1 and the surface S of the pattern recognition device is equal to about 2*θ. As shown in FIG. 3B, the pattern light ray L1 is incident onto the first inclined reflective face 231. An incident angle of the pattern light ray L1 on the first inclined reflective face 231 may be labeled as α, and the incident angle α may satisfy the equation "α+θ=90°". As shown in FIG. 3B, the pattern light ray L1 is reflected by the first inclined reflective face 231 and then is reflected by the second inclined reflective face 232 to the opening area A in a direction at an angle of θ with respect to the second inclined reflective face 232. The pattern light ray L2 is incident onto the first inclined reflective face 231, and an incident angle of the pattern light ray L2 on the first inclined reflective face 231 is larger than the above incident angle α, as shown in FIG. 3B. The pattern light ray L2 is reflected by the first inclined reflective face 231 to the first light absorbing surface 233. As a result, the pattern light ray L2 is absorbed by the first light absorbing surface 233. The pattern light ray L3 is incident onto the first inclined reflective face 231, and an incident angle of the pattern light ray L3 on the first inclined reflective face 231 is less than the above incident angle α, as shown in FIG. 3B. The pattern light ray L3 is reflected by the first inclined reflective face 231 to the second inclined reflective face 232, then is reflected by the second inclined reflective face 232 to the second light absorbing surface 234. As a result, the pattern light ray L3 is absorbed by the second light absorbing surface 234.

For example, in the above-described pattern recognition device provided by the embodiment of the present disclosure, as shown in FIG. 3C, both the included angle θ between the first inclined reflective face 231 and the base substrate 100 and the included angle θ between the second inclined reflective face 232 and the base substrate 100 are less than 45 degrees, that is, the slope angles are less than 45 degrees, the optical path selector 230 is configured to reflect the pattern light rays which have an angle of 2*θ degrees with respect to the surface of the pattern recognition device to the opening area A. In this case, in order to ensure that light rays reflected by the second inclined reflective face 232 in a direction at an angle of θ with respect to the second inclined reflective face 232 are all incident to the opening area A of the first light-shielding electrode 211, it is required that the orthographic projection of the opening area A of the first light-shielding electrode 211 on the base substrate 100 is offset rightward with respect to the orthographic projection of the second inclined reflective face 232 on the base substrate 100, and a specific offset value may depend on the value of θ and a distance between the second inclined reflective face 232 and the first light-shielding electrode 211. As shown in FIG. 3C, the pattern light rays reflected by a fingerprint may include a pattern light ray L1 reflected by a ridge of the fingerprint and pattern light rays L2, L3 reflected by valleys adjacent to the ridge. An included angle between the pattern light ray L1 and the surface S of the pattern recognition device is equal to about 2*θ. As shown in FIG. 3C, the pattern light ray L1 is incident onto the first inclined reflective face 231. An incident angle of the pattern light ray L1 on the first inclined reflective face 231 may be labeled as α, and the incident angle α may satisfy the equation "α+θ=90°". As shown in FIG. 3C, the pattern light ray L1 is reflected by the first inclined reflective face 231 and then is reflected by the second inclined reflective face 232 to the opening area A in a direction at an angle of θ with respect to the second inclined reflective face 232. The pattern light ray L2 is incident onto the first inclined reflective face 231, and an incident angle of the pattern light ray L2 on the first inclined reflective face 231 is larger than the above incident angle α, as shown in FIG. 3C, the pattern light ray L2 is reflected by the first inclined reflective face 231 to the first light absorbing surface 233. As a result, the pattern light ray L2 is absorbed by the first light absorbing surface 233. The pattern light ray L3 is incident onto the first inclined reflective face 231, and an incident angle of the pattern light ray L3 on the first inclined reflective face 231 is less than the above incident angle α, as shown in FIG. 3C, the pattern light ray L3 is reflected by the first inclined reflective face 231 to the second light absorbing surface 234. As a result, the pattern light ray L3 is absorbed by the second light absorbing surface 234.

In the above embodiments, the pattern light ray L1 reflected by the ridge of the fingerprint is reflected to the opening area A so that it is sensed by the photosensitive structure 210, and the pattern light rays L2, L3 reflected by the valleys of the fingerprint are absorbed by the light absorbing surfaces. Thus, the light rays reflected by the ridges of the fingerprint and the light rays reflected by the valleys of the fingerprint do not mix with each other in the photosensitive structure 210, so that the fingerprint may be identified at a high definition.

In specific implementation, in the above-described pattern recognition device provided by the embodiment of the present disclosure, when the optical path selector 230 is disposed between the base substrate 100 and the photosensitive structure 210, as shown in FIG. 1, the pattern recognizer 200 may further include a switching transistor 220 connected to the photosensitive structure 210, and the switching transistor 220 may be disposed between the base substrate 100 and the optical path selector 230. Of course, the switching transistor 220 may also be disposed on other film layers, which is not limited herein.

Moreover, in the above-described pattern recognition device provided by the embodiment of the present disclosure, as shown in FIG. 1, the first light-shielding electrode 211 may be electrically connected to a drain electrode of the switching transistor 220, correspondingly, the second light-shielding electrode 213 may be electrically connected to an electrode line VD which may apply a constant electrical potential. Alternatively, the first light-shielding electrode 211 may be electrically connected to an electrode line VD which may apply a constant electrical potential, correspondingly, the second light-shielding electrode 213 may be electrically connected to a drain electrode of the switching transistor 220. The embodiments of the present disclosure are not limited to the specific implementations.

In specific implementations, in the above-described pattern recognition device provided by the embodiment of the present disclosure, as shown in FIG. 1, the electrode line VD which may apply the constant electrical potential may be disposed in the same layer as the drain electrode of the switching transistor 220 to simplify a complexity of the film layers. Of course, the electrode line VD which may apply the constant electrical potential may be disposed in the same layer as a gate electrode of the switching transistor 220 or may be disposed in a separate conductive film layer. The embodiments of the present disclosure are not limited to the specific implementations.

Optionally, in the above-described pattern recognition device provided by the embodiment of the present disclosure, as shown in FIG. 2, the optical path selector 230 may also be disposed above the photosensitive structure 210, that is, the optical path selector 230 may be disposed on a side of the photosensitive structure 210 facing away from the base substrate 100. In this case, the optical path selector 230 needs to reflect the pattern light rays having the predetermined angle above the pattern recognition device to the opening area A of the photosensitive structure 210 below the optical path selector 230, thus the optical path selector 230 may be specifically embodied in structure as follows. The first inclined reflective face 231 and the second inclined reflective face 232 may be parallel to each other. Correspondingly, in the photosensitive structure 210, the second light-shielding electrode 213, the photoelectric conversion layer 212 and the first light-shielding electrode 211 are sequentially stacked on the base substrate 100, that is, the opening area A is provided above the photosensitive structure 210. In other words, the opening area A is disposed on a side of the photosensitive structure 210 facing away from the base substrate.

It should be noted that the specific structure of the optical path selector 230 is only an example. In actual application, when the optical path selector 230 is disposed above the photosensitive structure 210, the first inclined reflective face 231 may have a different slope angle from the second inclined reflective face 232, and an inclined direction of the first inclined reflective face 231 may be consistent with an inclined direction of the first inclined reflective face 231, thus the embodiment of the present disclosure is not limited to the specific structure here.

Further, in the above-described pattern recognition device provided by the embodiment of the present disclosure, when the optical path selector 230 is disposed above the photosensitive structure 210, in order to prevent pattern light rays except for the light rays which have the predetermined angle with respect to the surface of the pattern recognition device from entering the opening area A, undesired interference light rays may be absorbed. Specifically, as shown in FIG. 2, the optical path selector 230 may further include a third light absorbing face such as a third light absorbing surface 235, which is disposed on an upper surface of the first light-shielding electrode 211. The third light absorbing surface 235 may absorb the pattern light rays which have undesired angles and are reflected by the second inclined reflective face 232. Moreover, in specific implementation, the third light absorbing surface 235 may be disposed on the entire upper surface of the first light-shielding electrode 211, or may be disposed on a part of the upper surface of the first light-shielding electrode 211 which is just opposite to a portion between the first light-shielding electrode 211 and the second light-shielding electrode 212. The embodiments of the present disclosure are not limited to the specific implementation.

Similarly, in the above-described pattern recognition device provided by the embodiment of the present disclosure, when the optical path selector 230 is disposed above the photosensitive structure 210, in order to prevent pattern light rays except for the light rays which have the predetermined angle with respect to the surface of the pattern recognition device from entering the opening area A, undesired interference light rays may be absorbed. Specifically, as shown in FIG. 2, the optical path selector 230 may further include a fourth light absorbing face such as a fourth light absorbing surface 236, which is disposed on an end of the first inclined reflective face 231 or the second inclined reflective face 232 away from the base substrate 100. The fourth light absorbing surface 236 may absorb the pattern light rays which have undesired angles and are reflected by the first inclined reflective face 231. Moreover, a position of the fourth light absorbing surface 236 may be set such that it may not block an incident light path from the surface of the pattern recognition device to the first inclined reflective face 231.

Figure 4A:
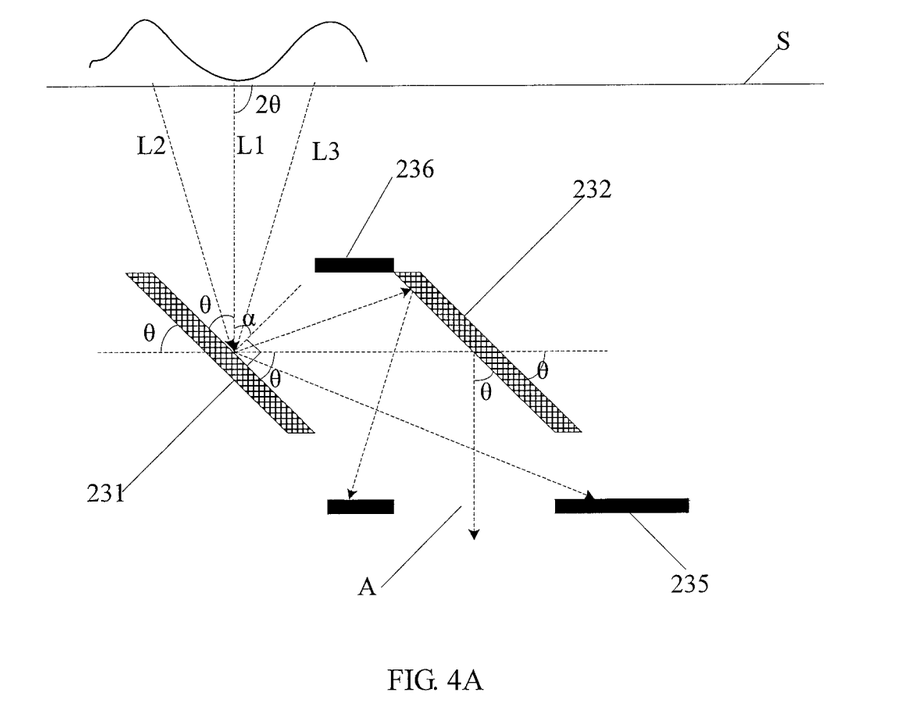
FIG. 4A to FIG. 4C are schematic diagrams showing specific principles of an optical path selector in the pattern recognition device shown in FIG. 2.
Figure 4B:
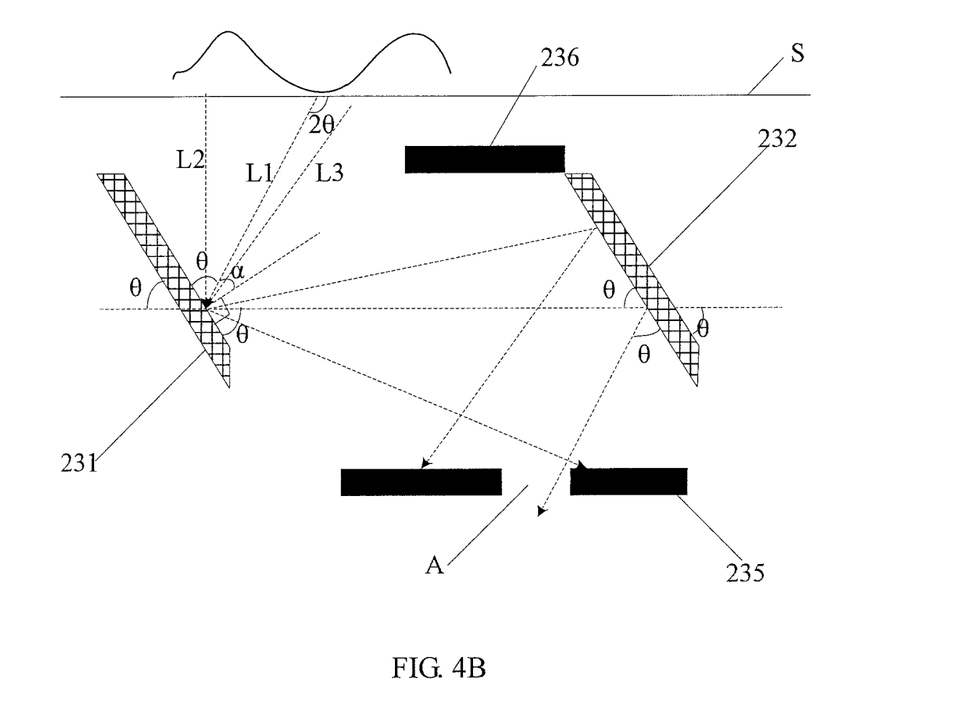
Figure 4C:
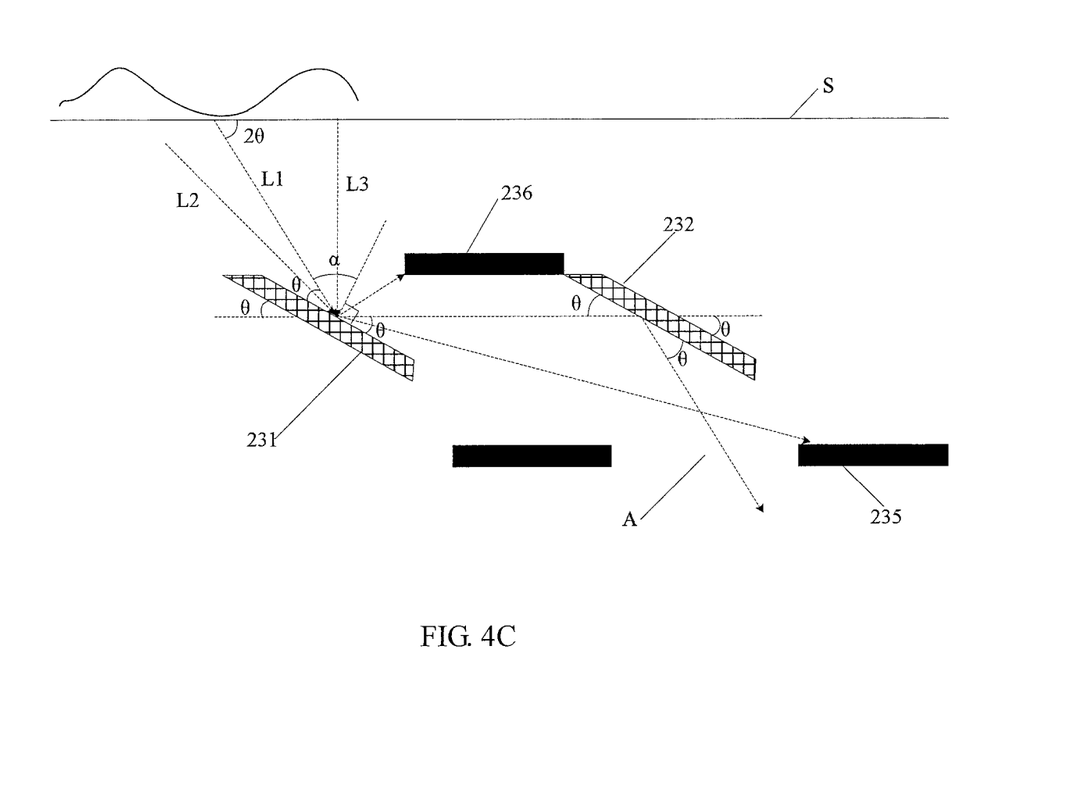

In specific implementation, in the above-described pattern recognition device provided by the embodiment of the present disclosure, when the optical path selector 230 is disposed above the photosensitive structure 210, as shown in FIG. 4A to FIG. 4C, an included angle between the first inclined reflective face 231 and the base substrate 100 may be equal to an included angle between the second inclined reflective face 232 and the base substrate 100, the included angles may have $\theta$ degrees, that is, the slope angles may be $\theta$ degrees. In this case, the optical path selector 230 is configured to reflect the pattern light rays which have an angle of $2*\theta$ degrees with respect to the surface of the pattern recognition device to the opening area A.

Thus, in the above-described pattern recognition device provided by the embodiment of the present disclosure, specific positions of the opening area A of the first light-shielding electrode 211 may be set according to a value of the slope angle $\theta$ of the first inclined reflective face 231 and a value of the slope angle $\theta$ of the second inclined reflective face 232.

For example, in the above-described pattern recognition device provided by the embodiment of the present disclosure, as shown in FIG. 4A, both the included angle $\theta$ between the first inclined reflective face 231 and the base substrate 100 and the included angle $\theta$ between the second inclined reflective face 232 and the base substrate 100 are equal to 45 degrees, that is, the slope angles are equal to 45 degrees, the optical path selector 230 is configured to reflect the pattern light rays perpendicular to the surface of the pattern recognition device to the opening area A. In this case, in order to ensure that vertical light rays reflected by the second inclined reflective face 232 are all incident to the opening area A of the first light-shielding electrode 211, it is required to make an orthographic projection of the opening area A of the first light-shielding electrode 211 on the base substrate 100 and an orthographic projection of the second inclined reflective face 232 on the base substrate 100 at least partially coincide with each other, that is, the opening area A is opposite to the second inclined reflective face 232 in a direction perpendicular to the base substrate 100. As shown in FIG. 4A, the pattern light rays reflected by a fingerprint may include a pattern light ray L1 reflected by a ridge of the fingerprint and pattern light rays L2, L3 reflected by valleys adjacent to the ridge. An included angle between the pattern light ray L1 and the surface S of the pattern recognition device is equal to about $2*\theta$, that is, the pattern light ray L1 is perpendicular to the surface S of the pattern recognition device. As shown in FIG. 4A, the pattern light ray L1 is incident onto the first inclined reflective face 231. An incident angle of the pattern light ray L1 on the first inclined reflective face 231 may be labeled as a, and the incident angle $\alpha$ may satisfy the equation "$\alpha+\theta=90°$". In the example, the incident angle $\alpha$ is equal to 45 degrees. As shown in FIG. 4A, the pattern light ray L1 is reflected by the first inclined reflective face 231 and then is reflected by the second inclined reflective face 232 to the opening area A in a vertical direction. The pattern light ray L2 is incident onto the first inclined reflective face 231, and an incident angle of the pattern light ray L2 on the first inclined reflective face 231 is larger than 45 degrees, as shown in FIG. 4A, the pattern light ray L2 is reflected by the first inclined reflective face 231 to the third light absorbing surface 235. As a result, the pattern light ray L2 is absorbed by the third light absorbing surface 235. The pattern light ray L3 is incident onto the first inclined reflective face 231, and an incident angle of the pattern light ray L3 on the first inclined reflective face 231 is less than 45 degrees, as shown in FIG. 4A, the pattern light ray L3 is reflected by the first inclined reflective face 231 to the second inclined reflective face 232, and then is reflected by the second inclined reflective face 232 to the third light absorbing surface 235. As a result, the pattern light ray L3 is absorbed by the third light absorbing surface 235. It is to be understood that the pattern light rays at other incident angles may also be reflected by the first inclined reflective face 231 to the fourth light absorbing surface 236 so as to be absorbed.

For example, in the above-described pattern recognition device provided by the embodiment of the present disclosure, as shown in FIG. 4B, both the included angle $\theta$ between the first inclined reflective face 231 and the base substrate 100 and the included angle θ between the second inclined reflective face 232 and the base substrate 100 are larger than 45 degrees, that is, the slope angles are larger than 45 degrees, the optical path selector 230 is configured to reflect the pattern light rays which have an angle of 2*θ degrees with respect to the surface of the pattern recognition device to the opening area A. In this case, in order to ensure that light rays reflected by the second inclined reflective face 232 in a direction at an angle of θ with respect to the second inclined reflective face 232 are all incident to the opening area A of the first light-shielding electrode 211, it is required that the orthographic projection of the opening area A of the first light-shielding electrode 211 on the base substrate 100 is offset leftward with respect to the orthographic projection of the second inclined reflective face 232 on the base substrate 100, and a specific offset value may depend on the value of θ and a distance between the second inclined reflective face 232 and the first light-shielding electrode 211. As shown in FIG. 4B, the pattern light rays reflected by a fingerprint may include a pattern light ray L1 reflected by a ridge of the fingerprint and pattern light rays L2, L3 reflected by valleys adjacent to the ridge. An included angle between the pattern light ray L1 and the surface S of the pattern recognition device is equal to about 2*θ. As shown in FIG. 4B, the pattern light ray L1 is incident onto the first inclined reflective face 231. An incident angle of the pattern light ray L1 on the first inclined reflective face 231 may be labeled as α, and the incident angle α may satisfy the equation "α+θ=90". As shown in FIG. 4B, the pattern light ray L1 is reflected by the first inclined reflective face 231 and then is reflected by the second inclined reflective face 232 to the opening area A in a direction at an angle of θ with respect to the second inclined reflective face 232. The pattern light ray L2 is incident onto the first inclined reflective face 231, and an incident angle of the pattern light ray L2 on the first inclined reflective face 231 is larger than the above incident angle α, as shown in FIG. 4B, the pattern light ray L2 is reflected by the first inclined reflective face 231 to the third light absorbing surface 235. As a result, the pattern light ray L2 is absorbed by the third light absorbing surface 235. The pattern light ray L3 is incident onto the first inclined reflective face 231, and an incident angle of the pattern light ray L3 on the first inclined reflective face 231 is less than the above incident angle α, as shown in FIG. 4B, the pattern light ray L3 is reflected by the first inclined reflective face 231 to the second inclined reflective face 232, then is reflected by the second inclined reflective face 232 to the third light absorbing surface 235. As a result, the pattern light ray L3 is absorbed by the third light absorbing surface 235. It is to be understood that the pattern light rays at other incident angles may also be reflected by the first inclined reflective face 231 to the fourth light absorbing surface 236 so as to be absorbed.

For example, in the above-described pattern recognition device provided by the embodiment of the present disclosure, as shown in FIG. 4C, both the included angle θ between the first inclined reflective face 231 and the base substrate 100 and the included angle θ between the second inclined reflective face 232 and the base substrate 100 are less than 45 degrees, that is, the slope angles are less than 45 degrees, the optical path selector 230 is configured to reflect the pattern light rays which have an angle of 2*θ degrees with respect to the surface of the pattern recognition device to the opening area A. In this case, in order to ensure that light rays reflected by the second inclined reflective face 232 in a direction at an angle of θ with respect to the second inclined reflective face 232 are all incident to the opening area A of the first light-shielding electrode 211, it is required that the orthographic projection of the opening area A of the first light-shielding electrode 211 on the base substrate 100 is offset rightward with respect to the orthographic projection of the second inclined reflective face 232 on the base substrate 100, and a specific offset value may depend on the value of θ and a distance between the second inclined reflective face 232 and the first light-shielding electrode 211. As shown in FIG. 4C, the pattern light rays reflected by a fingerprint may include a pattern light ray L1 reflected by a ridge of the fingerprint and pattern light rays L2, L3 reflected by valleys adjacent to the ridge. An included angle between the pattern light ray L1 and the surface S of the pattern recognition device is equal to about 2*θ. As shown in FIG. 4C, the pattern light ray L1 is incident onto the first inclined reflective face 231. An incident angle of the pattern light ray L1 on the first inclined reflective face 231 may be labeled as a, and the incident angle α may satisfy the equation "α+θ=90°". As shown in FIG. 4C, the pattern light ray L1 is reflected by the first inclined reflective face 231 and then is reflected by the second inclined reflective face 232 to the opening area A in a direction at an angle of θ with respect to the second inclined reflective face 232. The pattern light ray L2 is incident onto the first inclined reflective face 231, and an incident angle of the pattern light ray L2 on the first inclined reflective face 231 is larger than the above incident angle α, as shown in FIG. 4C, the pattern light ray L2 is reflected by the first inclined reflective face 231 to the third light absorbing surface 235. As a result, the pattern light ray L2 is absorbed by the third light absorbing surface 235. The pattern light ray L3 is incident onto the first inclined reflective face 231, and an incident angle of the pattern light ray L3 on the first inclined reflective face 231 is less than the above incident angle α, as shown in FIG. 4C, the pattern light ray L3 is reflected by the first inclined reflective face 231 to the fourth light absorbing surface 236. As a result, the pattern light ray L3 is absorbed by the fourth light absorbing surface 236.

In the above embodiments, the pattern light ray L1 reflected by the ridge of the fingerprint is reflected to the opening area A so that it is sensed by the photosensitive structure 210, and the pattern light rays L2, L3 reflected by the valleys of the fingerprint are absorbed by the light absorbing surfaces. Thus, the light rays reflected by the ridges of the fingerprint and the light rays reflected by the valleys of the fingerprint do not mix with each other in the photosensitive structure 210, so that the fingerprint may be identified at a high definition.

In specific implementation, in the above-described pattern recognition device provided by the embodiment of the present disclosure, when the optical path selector 230 is disposed above the photosensitive structure 210, as shown in FIG. 2, the pattern recognizer 200 may further include a switching transistor 220 connected to the photosensitive structure 210, and the switching transistor 220 may be disposed between the base substrate 100 and the photosensitive structure 210. Of course, the switching transistor 220 may also be disposed on other film layers, which is not limited herein.

Moreover, in the above-described pattern recognition device provided by the embodiment of the present disclosure, as shown in FIG. 2, the first light-shielding electrode 211 may be electrically connected to a drain electrode of the switching transistor 220, correspondingly, the second light-shielding electrode 213 may be electrically connected to an electrode line VD which may apply a constant electrical potential. Alternatively, the first light-shielding electrode 211 may be electrically connected to an electrode line VD which may apply a constant electrical potential, correspondingly, the second light-shielding electrode 213 may be electrically connected to a drain electrode of the switching transistor 220. The embodiments of the present disclosure are not limited to the specific implementations.

In specific implementations, in the above-described pattern recognition device provided by the embodiment of the present disclosure, as shown in FIG. 2, the electrode line VD which may apply the constant electrical potential may be disposed in the same layer as the drain electrode of the switching transistor 220 to simplify a complexity of the film layers. Of course, the electrode line VD which may apply the constant electrical potential may be disposed in the same layer as a gate electrode of the switching transistor 220 or may be disposed in a separate conductive film layer. The embodiments of the present disclosure are not limited to the specific implementations.

Specifically, in the above-described pattern recognition device provided by the embodiment of the present disclosure, the first light absorbing surface 233, the second light absorbing surface 234, the third light absorbing surface 235, and the fourth light absorbing surface 236 of the optical path selector 230 may be made of black light-absorbing materials such as a material forming a black matrix or the like. The first inclined reflective face 231 and the second inclined reflective face 232 may be made of metal. Moreover, an insulation layer below the first inclined reflective face 231 and the second inclined reflective face 232 may be etched to have desired slope angles, a metal layer may be deposited on sidewalls of the insulation layer, and the metal layer may be etched to form the first inclined reflective face 231 and the second inclined reflective face 232. In this way, the first inclined reflective face 231 and the second inclined reflective face 232 have the desired slope angles, respectively.

Based on the similar technical concept, an embodiment of the present disclosure may further provide an array substrate. Since the array substrate is similar in principle of solving the problem as any one of the above-described pattern recognition devices, the array substrate may be implemented by referring to the pattern recognition devices, which will not be repeated in detail here.

Figure 5:
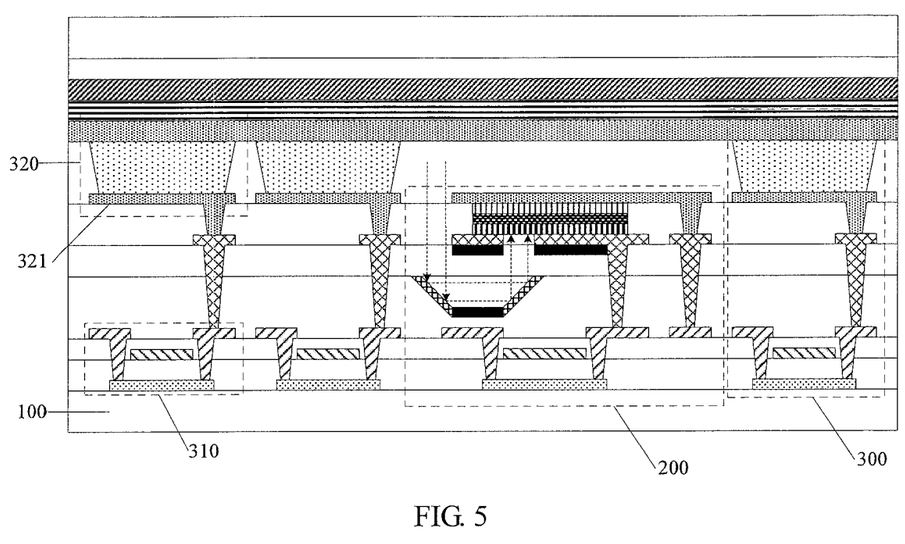
FIG. 5 is a schematic structural diagram of an array substrate according to an embodiment of the present disclosure.

Specifically, an array substrate provided by an embodiment of the present disclosure, as shown in FIG. 5, includes: a plurality of display units 300 in a display area, and the above-described pattern recognition provided by an embodiment of the present disclosure in the display area. As an example, only one pattern recognizer 200 in the pattern recognition device is shown in FIG. 5.

Specifically, in the above array substrate provided by the embodiment of the present disclosure, the array substrate has a certain module thickness so that a distance between the pattern and the photosensitive structure 210 is relatively large. When the pattern recognition device provided by the embodiment of the present disclosure is integrated into the array substrate, the optical path selector is formed by using two inclined reflective faces so that it may reflect the pattern light rays which have the predetermined angle with respect to the surface of the pattern recognition device to the photoelectric conversion layer of the photosensitive structure. Both the first light-shielding electrode and the second light-shielding electrode, which are stacked on the photoelectric conversion layer in the photosensitive structure, are opaque, and only the first light-shielding electrode is provided with the opening area, thus the pattern light rays may only irradiate onto the photoelectric conversion layer from the opening area. As a result, only the pattern light rays which have the predetermined angle with respect to the surface of the pattern recognition device may be incident to the opening area at a particular angle by means of reflection of the optical path selector. In this way, in a case where a distance between the pattern (for example, fingerprint of a finger) and the photosensitive structure is large (for example, the distance may be 1 mm), light ray reflected by valleys of the pattern and light ray reflected by ridges of the pattern do not mix with each other in the photosensitive structure, thus the pattern may be identified at high definition. Since the optical path selector is configured by using two inclined reflective faces which are relatively simple in structure to filter the pattern light rays at other angles, it is not necessary to provide a complicated light collimating device or an optical fiber in the pattern recognition device, which is easy to mass-produce.

In specific implementations, the array substrate provided by the embodiment of the present disclosure may be applied to an organic electroluminescent display panel, and may also be applied to a liquid crystal display panel, which is not limited herein. Specifically, when the above-mentioned array substrate provided by the embodiment of the present disclosure is applied to an organic electroluminescent display panel, as shown in FIG. 5, the display unit 300 may specifically include: a driving circuit having a driving transistor 310, and a light emitting structure 320. An anode 321 of the light-emitting structure 320 is electrically connected to the driving circuit, and the anode 321 is a reflective electrode, that is, the light-emitting structure 320 is of a top emission type. In this case, the switching transistor 220 in the pattern recognition device may be disposed in the same layer as the driving transistor 310, and the first light-shielding electrode or the second light-shielding electrode in the pattern recognition device may be disposed in the same layer as the anode 321, so as to minimize an amount of increased film layers required in the array substrate. As illustrated in FIG. 5, it shows that the second light-shielding electrode and the anode 321 are disposed in the same layer.

Based on the similar technical concept, an embodiment of the present disclosure may further provide a display apparatus including the above-mentioned array substrate provided by the embodiment of the present disclosure. The display apparatus may include any product or component having display function, such as a mobile phone, a tablet computer, a television, a display, a notebook computer, a digital photo frame or a navigator. The display apparatus may be implemented by referring to the embodiments of the array substrate, which will not be repeated in detail here.

In the pattern recognition device, the array substrate and the display apparatus provided by the embodiments of the present disclosure, the optical path selector is formed by using two inclined reflective faces so that it may reflect the pattern light rays which have the predetermined angle with respect to the surface of the pattern recognition device to the photoelectric conversion layer of the photosensitive structure. Both the first light-shielding electrode and the second light-shielding electrode, which are stacked on the photoelectric conversion layer in the photosensitive structure, are opaque, and only the first light-shielding electrode is provided with the opening area, thus the pattern light rays may only irradiate onto the photoelectric conversion layer from the opening area. In this way, in a case where a distance between the pattern (for example, fingerprint of a finger) and the photosensitive structure is large (for example, the distance may be 1 mm), light ray reflected by valleys of the pattern and light ray reflected by ridges of the pattern do not mix with each other in the photosensitive structure, thus the pattern may be identified at high definition. Therefore, it facilitates integrating the pattern recognition device into the display apparatus. Since the optical path selector is configured by using two inclined reflective faces which are relatively simple in structure to filter the pattern light rays at other angles, it is not necessary to provide a complicated light collimating device or an optical fiber in the pattern recognition device, which is easy to mass-produce.

It will be apparent to those skilled in the art that various changes and modifications can be made without departing from the spirit and scope of the disclosure. Thus, the present disclosure is intended to include these changes and modifications if these changes and modifications fall within the scope of the appended claims and equivalents thereof.

What is claimed is:

1. A pattern recognition device comprising:
   a base substrate; and
   a plurality of pattern recognizers on the base substrate, at least one of the plurality of pattern recognizers comprising a photosensitive structure and an optical path selector,
   wherein the photosensitive structure comprises a first light-shielding electrode, a photoelectric conversion layer and a second light-shielding electrode which are arranged in a stacked manner, the first light-shielding electrode comprising a light-transmitting region; and
   the optical path selector is configured to direct pattern light rays having a predetermined angle with respect to a surface of the pattern recognition device to the light-transmitting region.

2. The pattern recognition device of claim 1, wherein the optical path selector comprises:
   a first inclined reflective face; and
   a second inclined reflective face opposite to the first inclined reflective face.

3. The pattern recognition device of claim 2, wherein
   a distance between the first inclined reflective face and the second inclined reflective face is gradually increased in a direction from the base substrate to the photosensitive structure; and
   the first light-shielding electrode, the photoelectric conversion layer and the second light-shielding electrode are sequentially stacked in the direction from the base substrate to the photosensitive structure.

4. The pattern recognition device of claim 3, wherein the optical path selector further comprises: a first light absorbing face which connects the first inclined reflective face with the second inclined reflective face at a side of the optical path selector close to the base substrate.

5. The pattern recognition device of claim 3, wherein the optical path selector further comprises: a second light absorbing surface on a side of the first light-shielding electrode facing towards the base substrate.

6. The pattern recognition device of claim 3, wherein the at least one of the plurality of pattern recognizers further comprises: a switching transistor connected to the photosensitive structure, the switching transistor being disposed between the base substrate and the optical path selector.

7. The pattern recognition device of claim 2, wherein
   the first inclined reflective face and the second inclined reflective face are parallel to each other, and
   the second light-shielding electrode, the photoelectric conversion layer and the first light-shielding electrode are sequentially stacked in a direction from the base substrate to the photosensitive structure.

8. The pattern recognition device of claim 7, wherein the optical path selector further comprises: a third light absorbing face on a side of the first light-shielding electrode facing away from the base substrate.

9. The pattern recognition device of claim 7, wherein the optical path selector further comprises: a fourth light absorbing face at an end of the first inclined reflective face or the second inclined reflective face away from the base substrate.

10. The pattern recognition device of claim 7, wherein the at least one of the plurality of pattern recognizers further comprises: a switching transistor connected to the photosensitive structure, the switching transistor being disposed between the base substrate and the photosensitive structure.

11. The pattern recognition device of claim 2, wherein an included angle between the first inclined reflective face and the base substrate is equal to an included angle between the second inclined reflective face and the base substrate; and
   the optical path selector is configured to reflect the pattern light rays having the predetermined angle with respect to the surface of the pattern recognition device to the light-transmitting region, the predetermined angle being substantially double of the included angle between the first inclined reflective face and the base substrate or the included angle between the second inclined reflective face and the base substrate.

12. The pattern recognition device of claim 11, wherein each of the included angle between the first inclined reflective face and the base substrate and the included angle between the second inclined reflective face and the base substrate is equal to 45 degrees; and
   an orthographic projection of the light-transmitting region of the first light-shielding electrode on the base substrate and an orthographic projection of the second inclined reflective face on the base substrate at least partially coincide with each other.

13. The pattern recognition device of claim 11, wherein each of the included angle between the first inclined reflective face and the base substrate and the included angle between the second inclined reflective face and the base substrate is larger than or less than 45 degrees, and an orthographic projection of the light-transmitting region of the first light-shielding electrode on the base substrate is offset towards the first inclined reflective face with respect to an orthographic projection of the second inclined reflective face on the base substrate; or
   wherein each of the included angle between the first inclined reflective face and the base substrate and the included angle between the second inclined reflective face and the base substrate is less than 45 degrees, and an orthographic projection of the light-transmitting region of the first light-shielding electrode on the base substrate is offset away from the first inclined reflective face with respect to an orthographic projection of the second inclined reflective face on the base substrate.

14. The pattern recognition device of claim 6, wherein the first light-shielding electrode is electrically connected to a drain electrode of the switching transistor, and the second light-shielding electrode is electrically connected to an electrode line which applies a constant electrical potential; or
   wherein the first light-shielding electrode is electrically connected to an electrode line which applies a constant electrical potential, and the second light-shielding electrode is electrically connected to a drain electrode of the switching transistor.

15. The pattern recognition device of claim 14, wherein the electrode line which applies the constant electrical potential is disposed in the same layer as the drain electrode of the switching transistor.

16. The pattern recognition device of claim 2, wherein the optical path selector is disposed between the base substrate and the photosensitive structure, or the optical path selector is disposed on a side of the photosensitive structure facing away from the base substrate.

17. An array substrate comprising:
a plurality of display units in a display area; and
the pattern recognition device of claim 1 in the display area.

18. The array substrate of claim 17, wherein the display unit comprises a light emitting structure and a driving circuit comprising a driving transistor; an anode of the light emitting structure being electrically connected to the driving circuit, and the anode being a reflective electrode; and
the switching transistor of the pattern recognition device is disposed in the same layer as the driving transistor, and the first light-shielding electrode or the second light-shielding electrode of the pattern recognition device is disposed in the same layer as the anode.

19. A display apparatus comprising the array substrate of claim 17.

20. The pattern recognition device of claim 10, wherein the first light-shielding electrode is electrically connected to a drain electrode of the switching transistor, and the second light-shielding electrode is electrically connected to an electrode line which applies a constant electrical potential; or
wherein the first light-shielding electrode is electrically connected to an electrode line which applies a constant electrical potential, and the second light-shielding electrode is electrically connected to a drain electrode of the switching transistor.

* * * * *